W. H. LEE.
MEANS FOR RAISING AND LOWERING THE FRAMES OF PLOWS.
APPLICATION FILED SEPT. 29, 1910. RENEWED NOV. 9, 1912.
1,120,825.
Patented Dec. 15, 1914.
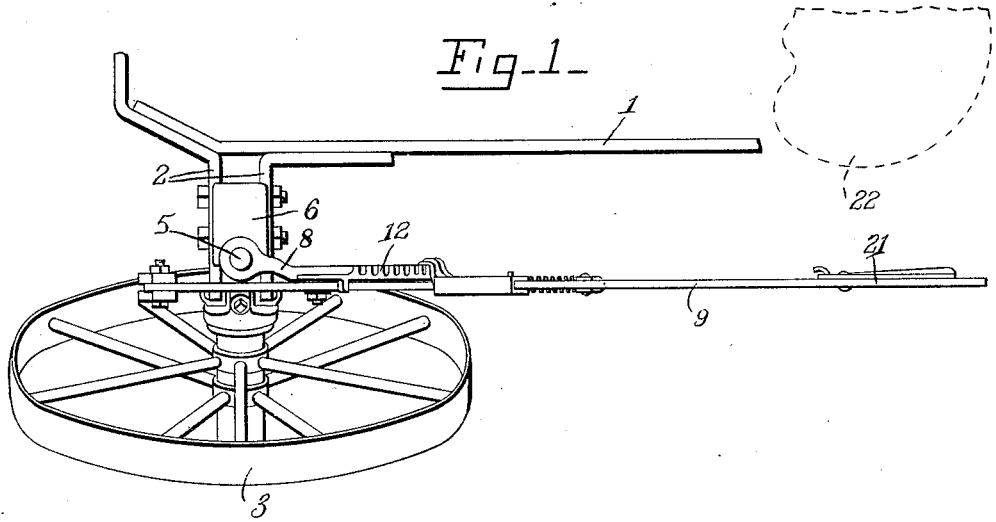
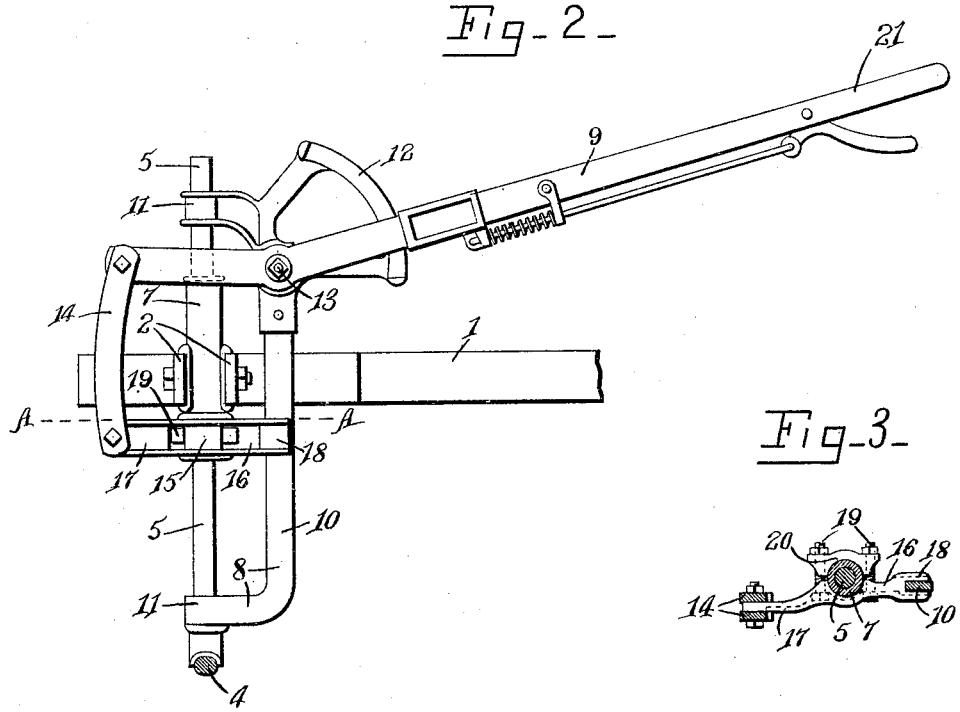
WITNESSES:
Chas H Young
S. Davis
INVENTOR
William H Lee
BY
Parsons Hall Bodell
ATTORNEYS

UNITED STATES PATENT OFFICE.

WILLIAM H. LEE, OF SYRACUSE, NEW YORK, ASSIGNOR TO SYRACUSE CHILLED PLOW COMPANY, OF SYRACUSE, NEW YORK, A CORPORATION OF NEW YORK.

MEANS FOR RAISING AND LOWERING THE FRAMES OF PLOWS.

1,120,825.     Specification of Letters Patent.     Patented Dec. 15, 1914.

Application filed September 29, 1910, Serial No. 584,388. Renewed November 9, 1912. Serial No. 730,494.

*To all whom it may concern:*

Be it known that I, WILLIAM H. LEE, of Syracuse, in the county of Onondaga and State of New York, have invented a certain new and useful Means for Raising and Lowering the Frames of Plows, of which the following is a specification.

My invention relates to sulky plows, and particularly to means for raising and lowering the frame of the plow; and it consists in the combinations and constructions hereinafter set forth and claimed.

In describing this invention reference is had to the accompanying drawing in which like characters designate corresponding parts in all the views.

Figure 1 is a top plan of a portion of a wheeled plow embodying my invention, parts being omitted. Fig. 2 is an elevation of parts seen in Fig. 1. Fig. 3 is a section on line A—A, Fig. 2.

In so far as this invention is concerned, my sulky plow comprises, generally, a frame, a supporting wheel, a connection between the wheel and the frame whereby the frame may be shifted, and means for raising and lowering the frame comprising a lever adjustable relatively to the connection to position its handle end in convenient reach of the seat. As here shown the connection between the wheel and the frame is adjustable and the lever is movable with said connection and adjustable relatively thereto.

The frame 1 may be of any desirable form, size and construction, and is here shown as formed with laterally-extending guides 2. The supporting wheel 3 is one of the two side wheels with which the sulky plow is usually provided, and is preferably the land side wheel. Said wheel 3 is mounted on an axle 4 having a spindle 5, said spindle being here shown as extending upwardly.

The connection between the wheel and frame whereby the frame may be shifted, comprises a block 6 adjustable along the guides 2, an upright non-rotatable bearing 7 carried by the block 6 and slidable along the spindle 5, a lever-supporting member 8 carried by the spindle and non-movable endwise thereon in the normal operation of the lever but adjustable about the spindle, and a lever 9 pivoted to the support 8 and connected to the frame 1. The block 6 may be held in its adjusted position in any suitable manner.

The lever support 8 rests upon a suitable collar located in an angle formed by the axle 4 and spindle 5 and thus is held from movement downwardly on the spindle 5, but no means is necessary for preventing movement of the support 8 upwardly, as during the raising of the frame the pressure of the lever 9 is downwardly and during the lowering of the frame it drops by gravity and no upward pressure is exerted on the lever 9. In fact usually downward pressure is applied by the operator to the handle of the lever 9 in order to prevent the frame from dropping too rapidly.

As here shown the lever-support 8 comprises a bar 10 extending parallel to the spindle 5 and having laterally-extending arms at its upper and lower ends which are formed with eyes or bearings 11 for receiving the spindle 5 above and below the bearing 7. Said lever-supporting member also carries a sector 12 with which coacts a pawl associated with the lever 9. The lever 9 is pivoted at 13 intermediate of its ends to the supporting member 8, and one arm thereof is connected by a link 14 to a part 15 carried by the nonrotatable bearing 7 and adjustable about the axis of said bearing, this part 15 having oppositely-extending arms 16, 17, one of which as 16 is provided with a forked end 18 which slidably interlocks with the bar 10, and the other arm of which is connected to the link 14. This part 15 is clamped upon the bearing 7, after it has been adjusted about the bearing 7 to the desired position, by bolts 19 passing transversely through said member 15 and through a block 20 engaging the opposite side of the sleeve or bearing 7. By operating the lever 9, the bearing 7 will be moved along the spindle 5, thereby raising or lowering the plow frame.

When the block 6 is adjusted outwardly rectilinearly, the lever 9 moves therewith and the rear or handle end 21 of the lever moves laterally relatively to the seat 22, so that if the lever is not adjusted into a position in which its handle end is nearer the seat, the operation thereof is awkward and arduous. When the block 6 has been shifted laterally the lever 9 can be adjusted so that its handle is within easy reach of the seat 22, by loosening the nuts of the bolts 19 and swinging the lever-supporting member 8 about the spindle 5 until the handle end is in the desired position, and then again tightening the nuts on the bolts 19.

What I claim is:—

1. In a sulky plow, a frame formed with a guide, a supporting wheel having an axle provided with a spindle, a connection between the wheel and the frame whereby the frame may be shifted, the connection including a block adjustable along the guide and formed with a non-rotatable bearing for said spindle, the bearing being slidable along the spindle for shifting the frame, an operating lever for shifting the frame, the lever being adjustable about the axis of the spindle for maintaining the free end of the lever in a predetermined position relative to the seat in the various positions of adjustment of said block, and means engaging the bearing for holding the lever in its adjusted position relatively to the spindle, substantially as and for the purpose set forth.

2. In a sulky plow, a frame formed with a guide, a supporting wheel having an axle provided with a spindle, a connection between the wheel and the frame whereby the frame may be shifted, the connection including a block adjustable along the guide and formed with a non-rotatable bearing for said spindle, the bearing being slidable along the spindle for shifting the frame, a lever-supporting member journaled on the spindle and non-movable endwise thereon, a lever pivoted to said member and connected to the frame, said supporting member being adjustable about the spindle, and means for holding said member in its adjusted position, substantially as and for the purpose described.

3. In a sulky plow, a frame having a bearing associated therewith, a supporting wheel having an axle formed with a spindle journaled in said bearing, the bearing being slidable along the spindle for shifting the frame, a lever-supporting member carried by the spindle and comprising a bar extending parallel to the spindle and a bearing extending laterally from the bar for receiving the spindle, a part movable along the spindle and engaging the first-mentioned bearing, said part having an arm slidably interlocking with said bar, and a lever pivoted to said member and connected to said part, substantially as and for the purpose described.

4. In a sulky plow, a frame having a bearing associated therewith, a supporting wheel having an axle formed with a spindle journaled in said bearing, the bearing being slidable along the spindle for shifting the frame, a lever-supporting member carried by the spindle and comprising a bar extending parallel to the spindle and a bearing extending laterally from the bar and receiving the spindle, a part movable along the spindle and engaging the sliding bearing, the part having oppositely-extending arms, one arm slidably interlocking with said bar, and a lever pivoted to the supporting member and connected to the other arm of said part, substantially as and for the purpose specified.

5. In a sulky plow, a frame having a bearing associated therewith, a supporting wheel having an axle provided with a spindle journaled in said bearing, the bearing being slidable along the spindle for shifting the frame, a lever-supporting member carried by the spindle and comprising a bar extending parallel to and spaced apart from the spindle and a bearing extending laterally from the bar and receiving the spindle, a lever pivoted to said member and connected to the frame, said bar being movable about the spindle for adjusting the position of the lever and means for normally holding the lever supporting member from movement about the spindle, substantially as and for the purpose set forth.

6. In a sulky plow, a frame formed with a guide, a supporting wheel having an axle provided with a spindle, a connection between the wheel and the frame whereby the frame may be shifted, the connection including a block adjustable along the guide and formed with an upright nonrotatable bearing for said spindle, the bearing being movable along the spindle for raising and lowering the frame, a lever-supporting member journaled on the spindle and non-movable endwise thereon, a lever pivoted to said member and connected to the frame, said member being movable about the spindle for adjusting the position of the lever relatively to the block when the block is adjusted along the guide, and means coacting with said bearing for holding said member in its adjusted position, substantially as and for the purpose described.

7. In a sulky plow, a frame formed with a guide, a supporting wheel having an axle provided with an upwardly-extending spindle, a connection between the wheel and the frame whereby the frame may be raised and lowered, the connection including a block adjustable along the guide, the block being formed with an upright bearing for the spindle, the bearing being slidable along the spindle for raising and lowering the frame, a lever-supporting member carried by the spindle and comprising a bar extending parallel to the spindle and bearings extending laterally from the bar for receiving the spindle above and below the upright bearing, a part slidable along the spindle and engaging the sliding bearing, said part having oppositely-extending arms, one arm slidably interlocking with said bar, a lever pivoted intermediate of its ends to the supporting member, and a link connecting one of the lever arms to the other arm of said part, the supporting member being movable about the spindle for adjusting the position of the lever when the block is adjusted along the guide, substantially as and for the purpose specified.

8. In a sulky plow, a frame having a bearing associated therewith, a supporting wheel having an axle formed with a spindle journaled in said bearing, the bearing being slidable along the spindle for shifting the frame, a lever-supporting member carried by the spindle and comprising a bar extending parallel to the spindle and a bearing extending laterally from the bar for receiving the spindle, a part movable with said bearing and being adjustable about the axis of the bearing, said part having an arm slidably interlocking with said bar, a lever pivoted to said member and connected to said part, and means for clamping said part to the non-rotatable bearing, substantially as and for the purpose set forth.

9. In a sulky plow, a frame formed with a guide, a supporting wheel having an axle formed with an upwardly-extending spindle, a connection between the wheel and the frame whereby the frame may be raised and lowered, the connection including a block adjustable along the guide and provided with a non-rotatable upright bearing for the spindle, the bearing being slidable along the spindle for raising and lowering the frame, a lever-supporting member carried by the spindle and comprising a bar extending parallel to the spindle and bearings extending laterally from the bar and receiving the spindle above and below the upright bearing of the frame, a part carried by the non-rotatable bearing and adjustable about the axis of said bearing, said part having oppositely-extending arms, one arm slidably interlocking with said bar, a lever pivoted intermediate of its ends to the supporting member, a link connecting one of the lever arms to the other arm of said part, the supporting member being movable about the spindle for adjusting the lever when the block is adjusted along the guide, and means for clamping said part upon the non-rotatable bearing for holding the lever supporting member in its adjusted position, substantially as and for the purpose described.

10. In a sulky plow and in combination, a frame formed with a laterally extending guide, a stationary seat, a bearing adjustable bodily lengthwise of the guide, a supporting wheel having an axle provided with a spindle journaled in the bearing, said bearing being movable lengthwise of the spindle for raising and lowering the frame, means for moving the bearing lengthwise of the spindle including a lever fulcrumed in proximity to the spindle and having a rearwardly extending handle extending into proximity to said seat, the fulcrum of said lever being shiftable about the axis of the spindle for compensating for the adjustment of the bearing in the guide and thereby maintaining the handle of the lever in approximately the same position relative to the seat in the various positions of the bearing lengthwise of the guide, substantially as and for the purpose described.

11. In a sulky plow, a frame, a seat mounted thereon, a bearing adjustable on the frame transversely in reference thereto, a supporting wheel having an axle provided with a spindle journaled in the bearing, the bearing being slidable along the spindle for shifting the frame, a lever supporting member carried by the spindle and comprising a bar extending parallel to, and spaced apart therefrom and bearings extending laterally from the bar for receiving the spindle, and a lever pivoted to the bar and connected to the frame, said supporting member being movable about the spindle for adjusting the position of the lever for maintaining approximately the same position of the outer end of the lever respecting the seat in all of the transverse adjustments of the bearing, substantially as and for the purpose specified.

In testimony whereof, I have hereunto signed my name in the presence of two attesting witnesses, at Syracuse, in the county of Onondaga, in the State of New York, this 22 day of Sept. 1910.

WILLIAM H. LEE.

Witnesses:
CHAS. H. YOUNG,
GEORGE W. FALES.